United States Patent
Hijiya et al.

(10) Patent No.: US 10,611,671 B2
(45) Date of Patent: Apr. 7, 2020

(54) HEAT-RAY- AND ULTRAVIOLET-ABSORBENT GLASS SHEET, AND METHOD FOR MANUFACTURING SAME

(71) Applicant: AGC Inc., Chiyoda-ku (JP)

(72) Inventors: Hiroyuki Hijiya, Tokyo (JP); Kensuke Nagai, Tokyo (JP); Eriko Maeda, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 102 days.

(21) Appl. No.: 15/785,593

(22) Filed: Oct. 17, 2017

(65) Prior Publication Data

US 2018/0037491 A1 Feb. 8, 2018

Related U.S. Application Data

(63) Continuation of application No. PCT/JP2016/062413, filed on Apr. 19, 2016.

(30) Foreign Application Priority Data

Apr. 23, 2015 (JP) ................. 2015-088582

(51) Int. Cl.
*C03C 3/087* (2006.01)
*C03C 3/078* (2006.01)
*C03C 4/08* (2006.01)
*C03B 19/02* (2006.01)

(52) U.S. Cl.
CPC .............. *C03C 3/087* (2013.01); *C03C 3/078* (2013.01); *C03C 4/08* (2013.01); *C03B 19/02* (2013.01)

(58) Field of Classification Search
CPC ............ C03C 3/087; C03C 3/078; C03C 4/08
See application file for complete search history.

(56) References Cited

U.S. PATENT DOCUMENTS

| | | | |
|---|---|---|---|
| 6,114,264 A | 9/2000 | Krumwiede et al. | |
| 6,313,053 B1 | 11/2001 | Shelestak | |
| 6,673,730 B1 | 1/2004 | Shelestak | |
| 7,151,065 B2 | 12/2006 | Thomsen et al. | |
| 2001/0034295 A1 | 10/2001 | Seto et al. | |
| 2003/0216242 A1 | 11/2003 | Arbab et al. | |
| 2007/0072760 A1 | 3/2007 | Taguchi et al. | |
| 2012/0135851 A1 | 5/2012 | Okada et al. | |
| 2012/0289394 A1 | 11/2012 | Nagai et al. | |
| 2017/0029317 A1 | 2/2017 | Shimada et al. | |

FOREIGN PATENT DOCUMENTS

| | | | |
|---|---|---|---|
| EP | 3 141 531 A1 | 3/2017 | |
| JP | 8-48540 | 2/1996 | |
| JP | 2000-143287 | 5/2000 | |
| JP | 2001-520167 | 10/2001 | |
| JP | 2002-12444 | 1/2002 | |
| JP | 2002-316832 | 10/2002 | |
| JP | 2006-518324 | 8/2006 | |
| WO | WO 2005/042425 A1 | 5/2005 | |
| WO | WO 2011/019079 A1 | 2/2011 | |
| WO | WO-2015170759 A1 * | 11/2015 | ............. C03C 4/082 |

OTHER PUBLICATIONS

Extended European Search Report dated Oct. 19, 2018 in European Patent Application No. 16783162.7, citing documents AA and AO therein, 10 pages.
International Search Report dated Aug. 2, 2016 in PCT/JP2016/062413, filed on Apr. 19, 2016 (with English Translation).
Written Opinion dated Aug. 2, 2016 in PCT/JP2016/062413, filed on Apr. 19, 2016.

* cited by examiner

*Primary Examiner* — Elizabeth A. Bolden
(74) *Attorney, Agent, or Firm* — Oblon, McClelland, Maier & Neustadt, L.L.P.

(57) ABSTRACT

The present invention aims to provide a heat-ray- and ultraviolet-absorbing glass plate having low solar transmittance and ultraviolet transmittance, having a high visible light transmittance, and containing a small amount of bubbles. The present invention relates to a heat-ray- and ultraviolet-absorbing glass plate that is a soda lime glass having a specific composition, having a mass proportion of divalent iron to the total iron being 50% or more, and having, as a value calculated as 4 mm thickness of the glass plate, a visible light transmittance Tv of 66% or more, a solar transmittance Te of 65% or less, a ratio Tv/Te of Tv and Te of 1.3 or more, and an ultraviolet transmittance Tuv of 50% or less.

20 Claims, No Drawings

HEAT-RAY- AND ULTRAVIOLET-ABSORBENT GLASS SHEET, AND METHOD FOR MANUFACTURING SAME

TECHNICAL FIELD

The present invention relates to a heat-ray- and ultraviolet-absorbing glass plate and a method for producing the same.

BACKGROUND ART

A heat-ray-absorbing glass plate is required to have a low solar transmittance and a high visible light transmittance. That is, it is required to have a high ratio, Tv/Te, of the visible light transmittance (illuminant A, 2° visual field) (hereinafter also referred to as Tv) as defined in JIS R 3106 (1998) as a value calculated as 4 mm thickness of the glass plate to the solar transmittance (hereinafter also referred to as Te) as defined in JIS R 3106 (1998) as a value calculated as 4 mm thickness of the glass plate.

Moreover, it is sometimes required for a heat-ray-absorbing glass plate to have a low ultraviolet transmittance (hereinafter also referred to as Tuv) as defined in ISO 9050 (2003) simultaneously.

As heat-ray- and ultraviolet-absorbing glass plates, for example, the following glass plates have been proposed.

(1) A neutral gray colored glass composition containing:
a base glass portion consisting of:

| | |
|---|---|
| $SiO_2$ | 66 to 75 weight %, |
| $Na_2O$ | 10 to 20, |
| CaO | 5 to 15, |
| MgO | 0 to 5, |
| $Al_2O_3$ | 0 to 5, and |
| $K_2O$ | 0 to 5, | and
a colorant portion essentially consisting of:

| | |
|---|---|
| $Fe_2O_3$ (total iron) | 0.30 to 0.70 weight %, |
| FeO | 0.21 weight % or less, |
| CoO | 3 to 50 ppm, |
| Se | 1 to 15 ppm, | in which the glass has a luminous transmittance of 60% or more at a thickness of 3.9 mm (Patent Document 1).

(2) An infrared and ultraviolet radiation absorbing blue colored glass composition containing:
a base glass portion consisting of:

| | |
|---|---|
| $SiO_2$ | about 66 to 75 weight %, |
| $Na_2O$ | about 10 to 20 weight %, |
| CaO | about 5 to 15 weight %, |
| MgO | 0 to about 5 weight %, |
| $Al_2O_3$ | 0 to about 5 weight %, and |
| $K_2O$ | 0 to about 5 weight %, | and
a solar radiation absorbing portion and a colorant portion essentially consisting of:

| | |
|---|---|
| total iron | about 0.40 to 1.0 weight %, |
| CoO | about 4 to 40 ppm, and |
| $Cr_2O_3$ | 0 to about 100 ppm; | in which the glass has a redox of 0.35 to about 0.60; a luminous transmittance of at least 55%; a color characterized by a dominant wavelength of 485 to 489 nm and an excitation purity of about 3 to 18% (Patent Document 2).

(3) A glass plate containing, as represented by mass percentage based on components:

| | |
|---|---|
| $SiO_2$ | 65 to 75%, |
| $Al_2O_3$ | 0.1 to 5%, |
| MgO | 1 to 6%, |
| CaO | 1 to 15%, |
| $Na_2O + K_2O$ | 10 to 18%, |
| total iron calculated as $Fe_2O_3$ | 0.10 to 0.42%, |
| divalent iron calculated as FeO | 0.05 to 0.25%, |
| CoO | 0.0004 to 0.0050%, and |
| Se | 0.0004 to 0.0018%, | and
having a visible light transmittance being 70% or more at a thickness of 4 mm, a solar transmittance being 60%/c or less at a thickness of 4 mm, and a ultraviolet transmittance being 40% or less at a thickness of 4 mm (Patent Document 3).

(4) A neutral gray colored glass composition for obtaining automotive vision panels with reduced transmitted color shift characteristics, having
a base portion containing:

| | |
|---|---|
| $SiO_2$ | 65 to 75 weight %, |
| $Na_2O$ | 10 to 20 weight %, |
| CaO | 5 to 15 weight %, |
| MgO | 0 to 5 weight %, |
| $Al_2O_3$ | 0 to 5 weight %, and |
| $K_2O$ | 0 to 5 weight %, | and
a major colorant containing:

| | |
|---|---|
| $Fe_2O_3$ (total iron) | 0.30 to 0.75 weight %, |
| CoO | 0 to 15 ppm, and |
| Se | 1 to 15 ppm, | in which the glass has a luminous transmittance of at least 65% at a thickness of 3.9 mm; a redox ratio of from 0.26 to 0.675; a total solar energy transmittance (TSET) of 65% or less, and a standard transmitted color shift of less than 6 (Patent Document 4).

(5) A glass plate containing, as represented by mass percentage based on components:

| | |
|---|---|
| $SiO_2$ | 67 to 75%, |
| $Na_2O$ | 10 to 20%, |
| CaO | 5 to 15%, |
| MgO | 0 to 7%, |
| $Al_2O_3$ | 0 to 7%, |
| $K_2O$ | 0 to 7%, |
| total iron calculated as $Fe_2O_3$ | 0.25 to 0.70%, |
| $CeO_2$ | 0.01 to 1.0%, |
| Se | 0.00001 to 0.05%, |
| CoO | 0.0001 to 0.05%, and |
| $TiO_2$ | 0 to 1.0%, | and having a mass ratio (FeO/t-Fe$_2$O$_3$) of divalent iron calculated as FeO to total iron calculated as Fe$_2$O$_3$ being 0.30 or more, a visible light transmittance being 65% or more, an infrared transmittance being 35% or less, an ultraviolet transmittance being 40% or less, and a total solar energy transmittance being 52% or less (Patent Document 5).

PRIOR ART DOCUMENTS

Patent Document

Patent Document 1: JP-A-H08-048540
Patent Document 2: JP-T-2001-520167
Patent Document 3: JP-A-2002-012444
Patent Document 4: JP-T-2006-518324
Patent Document 5: U.S. Pat. No. 7,151,065

SUMMARY OF THE INVENTION

Problems that the Invention is to Solve

However, in the glasses of the above (1) to (5), it is difficult to obtain predetermined optical properties and they are glasses in which bubbles are easily generated. It is considered to contain salt cake (Na$_2$SO$_4$) or the like in a glass raw material as a refining agent at melting. However, since predetermined optical properties are difficult to obtain when sulfur is simply contained in the glasses of the above (1) to (5), sulfur is not contained in Examples. As a result, in the glasses containing no sulfur, bubbles particularly tend to be easily generated. Accordingly, the glasses of the above (1) to (5) are glasses in which both of the predetermined optical properties and the bubble quality are difficult to achieve at the same time.

Sulfur is present as negative divalent or hexavalent sulfur in glass, and the negative divalent sulfur is amber-colored as having an absorption peak at a wavelength in the vicinity of 380 nm, and the hexavalent sulfur is colorless. Here, in order to increase Tv/Te in a glass plate, it is considered to increase FeO/Fe$_2$O$_3$, that is, to increase the proportion of divalent iron having an absorption peak at a wavelength in the vicinity of 1,100 nm and to reduce the proportion of trivalent iron having an absorption peak at a wavelength in the vicinity of 400 nm. And, in order to increase FeO/Fe$_2$O$_3$, it is considered to add a reducing agent (coke, etc.) in a large amount to a glass raw material. However, when trivalent iron is reduced to divalent iron by the reducing agent, hexavalent sulfur is also reduced to negative divalent sulfur by the reducing agent, thereby producing significant amber coloring. Accordingly, even if FeO/Fe$_2$O$_3$ is increased in order to increase Tv/Te, Tv is decreased by amber coloring and thus, Tv/Te is kept low. Also, gray color is not obtained due to amber coloring.

Moreover, in order to decrease Tuv of a glass plate, it is considered to use cerium as an ultraviolet-absorbing material. However, in the case where cerium is contained in the glass plates of the above (1) to (5), the following problem may occur.

Cerium is present as tetravalent or trivalent cerium in glass. As a glass material, stable ceria (CeO$_2$) is used. However, since tetravalent cerium functions as an oxidizing agent, divalent iron is oxidized to trivalent iron. Accordingly, when cerium is contained in a glass plate in order to decrease Tuv of the glass plate, FeO/Fe$_2$O$_3$ is decreased and Tv/Te is kept low.

The present invention provides a heat-ray- and ultraviolet-absorbing glass plate having low solar transmittance and ultraviolet transmittance, having a high visible light transmittance, and containing less bubbles and a method for producing the same.

Means for Solving the Problems

The present invention includes the following embodiments.

[1] A heat-ray- and ultraviolet-absorbing glass plate that is a soda lime glass containing, as represented by mass percentage based on oxides:

| | |
|---|---|
| total iron calculated as Fe$_2$O$_3$ | 0.05 to 0.35%, preferably 0.05 to 0.3%, |
| total tin calculated as SnO$_2$ | 0.02 to 0.5%, |
| total cerium calculated as CeO$_2$ | 0.01 to 5%, and |
| total sulfur calculated as SO$_3$ | 0.003 to 0.1%, | and having a mass proportion of divalent iron calculated as Fe$_2$O$_3$ to the total iron calculated as Fe$_2$O$_3$ being 50% or more, a visible light transmittance Tv (illuminant A, 2° visual field) as defined in JIS R 3106 (1998) being 66% or more as a value calculated as 4 mm thickness of the glass plate, a solar transmittance Te as defined in JIS R 3106 (1998) being 65% or less as a value calculated as 4 mm thickness of the glass plate, a ratio Tv/Te of the visible light transmittance Tv (illuminant A, 2° visual field) as defined in JIS R 3106 (1998) as a value calculated as 4 mm thickness of the glass plate to the solar transmittance Te as defined in JIS R 3106 (1998) as a value calculated as 4 mm thickness of the glass plate being 1.3 or more, and an ultraviolet transmittance Tuv as defined in ISO 9050 (2003) being 50% or less as a value calculated as 4 mm thickness of the glass plate.

[2] The heat-ray- and ultraviolet-absorbing glass plate according to the above [1], in which the soda lime glass contains, as represented by mass percentage based on oxides:

| | |
|---|---|
| SiO$_2$ | 65 to 80%, |
| Al$_2$O$_3$ | 0 to 6%, |
| MgO | 0 to 10%, |
| CaO | 5 to 12%, |
| Na$_2$O | 5 to 18%, and |
| K$_2$O | 0 to 5%. |

[3] The heat-ray- and ultraviolet-absorbing glass plate according to the above [1] or [2], further containing, as represented by mass percentage based on components:
Se: 0.0001 to 0.0050%, and
having an excitation purity Pe as defined in JIS Z 8701 (1999) being 3% or less as a value calculated as 4 mm thickness of the glass plate.

[4] The heat-ray- and ultraviolet-absorbing glass plate according to any one of the above [1] to [3], having a* value and b* value as defined in JIS Z 8781 (1999) satisfying: −10≤a*≤2 and −4≤b*≤6, as values calculated as 4 mm thickness of the glass plate.

[5] The heat-ray- and ultraviolet-absorbing glass plate according to any one of the above [1] to [4], further containing, as represented by mass percentage based on oxides:
CoO: 0.00005 to 0.0030%.

[6] The heat-ray- and ultraviolet-absorbing glass plate according to any one of the above [1] to [5], satisfying a mass ratio ($SnO_2/SO_3$) of the content of the total tin calculated as $SnO_2$ to the content of the total sulfur calculated as $SO_3$ being from 0.2 to 100.

[7] The heat-ray- and ultraviolet-absorbing glass plate according to any one of the above [1] to [6], satisfying a ratio (($SnO_2/SO_3$)/Fe-redox) of the mass ratio ($SnO_2/SO_3$) of the content of the total tin calculated as $SnO_2$ to the content of the total sulfur calculated as $SO_3$ to the mass proportion (Fe-redox) of divalent iron calculated as $Fe_2O_3$ to the total iron calculated as $Fe_2O_3$ being from 0.0025 to 5.

[8] The heat-ray- and ultraviolet-absorbing glass plate according to any one of the above [1] to [7], satisfying the following N value being 0 or more:

N value=(mass of divalent iron calculated as $Fe_2O_3$)−40×(total iron calculated as $Fe_2O_3$)−6×(total tin calculated as $SnO_2$)+5×(total sulfur calculated as $SO_3$)+(total cerium calculated as $CeO_2$)+14, provided that the mass of divalent iron calculated as $Fe_2O_3$ is the product of Fe-redox and the total iron calculated as $Fe_2O_3$.

[9] A method for producing a heat-ray- and ultraviolet-absorbing glass plate, comprising: preparing a glass raw material to be the following glass composition; melting the raw material at 1,400° C. to 1,550° C. in a melting furnace to form molten glass; and forming the molten glass into a glass plate by a plate glass-forming apparatus, to thereby obtain a glass plate having a mass proportion of divalent iron calculated as $Fe_2O_3$ to total iron calculated as $Fe_2O_3$ being 50% or more, a visible light transmittance Tv (illuminant A, 2° visual field) as defined in JIS R 3106 (1998) being 66% or more as a value calculated as 4 mm thickness of the glass plate, a solar transmittance Te as defined in JIS R 3106 (1998) being 65% or less as a value calculated as 4 mm thickness of the glass plate, a ratio Tv/Te of the visible light transmittance Tv (illuminant A, 2° visual field) as defined in JIS R 3106 (1998) as a value calculated as 4 mm thickness of the glass plate to the solar transmittance Te as defined in JIS R 3106 (1998) as a value calculated as 4 mm thickness of the glass plate being 1.3 or more, and a ultraviolet transmittance Tuv as defined in ISO 9050 (2003) being 50% or less as a value calculated as 4 mm thickness of the glass plate:

a soda lime glass containing, as represented by mass percentage based on oxides,

| | |
|---|---|
| total iron calculated as $Fe_2O_3$ | 0.05 to 0.35%, preferably 0.05 to 0.3%, |
| total tin calculated as $SnO_2$ | 0.02 to 0.5%, |
| total cerium calculated as $CeO_2$ | 0.01 to 5%, and |
| total sulfur calculated as $SO_3$ | 0.003 to 0.1%. |

Advantageous Effects of the Invention

The heat-ray- and ultraviolet-absorbing glass plate of the present invention is a glass having low solar transmittance and ultraviolet transmittance, having a high visible light transmittance, and containing less bubbles. The heat-ray- and ultraviolet-absorbing glass plate of the present invention is preferably a gray colored glass with suppressed amber color.

MODE FOR CARRYING OUT THE INVENTION

The following definitions of terms are applicable throughout the present description and claims.

The expression "to" defining a numerical range is used to include the numerical values before and after it as the lower limit value and the upper limit value.

Moreover, "weight percentage" and "mass percentage", "weight ratio" and "mass ratio", and "weight proportion" and "mass proportion" have the same meanings, respectively with each other. In the case of simply described as "%", it means "weight %".

The content of total iron is represented as an amount of $Fe_2O_3$ in accordance with a standard method of analysis. However, not the entire iron present in glass is present as trivalent iron, but divalent iron is also present.

The content of total tin is represented as an amount of $SnO_2$ in accordance with a standard method of analysis. However, not the entire tin present in glass is present as tetravalent tin, and divalent tin is also present.

The content of total cerium is represented as an amount of $CeO_2$ in accordance with a standard method of analysis. However, not the entire cerium present in glass is present as tetravalent cerium, and trivalent cerium is also present.

The content of total sulfur is represented as an amount of $SO_3$ in accordance with a standard method of analysis. However, not the entire sulfur present in glass is present as hexavalent sulfur, and negative divalent sulfur is also present.

The visible light transmittance Tv is visible light transmittance calculated by measuring transmittance by a spectrophotometer in accordance with JIS R 3106 (1998). As the coefficient, a value of the 2° visual field with standard illuminant A is used.

The solar transmittance Te is solar transmittance calculated by measuring transmittance by a spectrophotometer in accordance with JIS R 3106 (1998).

The ultraviolet transmittance Tuv is ultraviolet transmittance calculated by measuring transmittance by a spectrophotometer in accordance with ISO 9050 (2003).

The excitation purity Pe is excitation purity calculated in accordance with JIS Z 8701 (1999).

The dominant wavelength Dw of the transmitted light is dominant wavelength of the transmitted light, which is calculated in accordance with JIS Z 8701 (1999).

SDF (Skin damage factor) is a value calculated by measuring transmittance by a spectrophotometer in accordance with ISO 9050 (2003).

L*, a*, b*, and c* are color degrees of the transmitted light in the L*a*b* color system, which are calculated in accordance with JIS Z 8781 (1999). Incidentally, c* is calculated from $c^* = (a^{*2} + b^{*2})^{1/2}$.

The heat-ray- and ultraviolet-absorbing glass plate according to the present invention is characterized in that it is a soda lime glass containing, as represented by mass percentage based on oxides:

| | |
|---|---|
| total iron calculated as $Fe_2O_3$ | 0.05 to 0.35%, preferably 0.05 to 0.3%, |
| total tin calculated as $SnO_2$ | 0.02 to 0.5%, |
| total cerium calculated as $CeO_2$ | 0.01 to 5%, preferably 0.01 to 3.5%, and |
| total sulfur calculated as $SO_3$ | 0.003 to 0.1%, | and has a mass ratio (hereinafter also referred to as Fe-redox) of divalent iron calculated as $Fe_2O_3$ to total iron calculated as $Fe_2O_3$ being 50% or more, Tv being 66% or more as a value calculated as 4 mm thickness of the glass plate, Te being 65% or less as a value calculated as 4 mm thickness of the glass plate, a ratio Tv/Te of Tv as a value calculated as 4 mm thickness of the glass plate to Te as a value calculated as 4 mm thickness of the glass plate being 1.3 or more, and Tuv being 50% or less as a value calculated as 4 mm thickness of the glass plate.

The soda lime glass preferably contains, as represented by mass percentage based on oxides:

| | |
|---|---|
| SiO$_2$ | 65 to 80%, |
| Al$_2$O$_3$ | 0 to 6%, |
| MgO | 0 to 10%, |
| CaO | 5 to 12%, |
| Na$_2$O | 5 to 18%, and |
| K$_2$O | 0 to 5%. |

In the case where the SiO$_2$ content is 65% or more, weather resistance is good and the case is preferable. The SiO$_2$ content is more preferably 66% or more, further preferably 67% or more, and further more preferably 68% or more. In the case where the SiO$_2$ content is 80% or less, devitrification hardly occurs and the case is preferable. The SiO$_2$ content is more preferably 78% or less, further preferably 76% or less, and further more preferably 74% or less.

Al$_2$O$_3$ is a component to improve weather resistance.

The Al$_2$O$_3$ content is 0% or more. In the case where Al$_2$O$_3$ is contained, weather resistance is good. The Al$_2$O$_3$ content is preferably 0.1% or more, more preferably 0.2% or more, and further preferably 0.3% or more. In the case where the Al$_2$O$_3$ content is 6% or less, melting property is good and the case is preferable. The Al$_2$O$_3$ content is more preferably 5% or less, and further preferably 4% or less.

MgO is a component accelerating melting of the glass raw material and improving weather resistance.

The MgO content is 0% or more. In the case where MgO is contained, melting property and weather resistance are good. The MgO content is more preferably 0.1% or more, further preferably 0.3% or more, and further more preferably 0.5% or more. In the case where the MgO content is 10% or less, devitrification hardly occurs and the case is preferable. The MgO content is more preferably 8% or less, further preferably 6% or less, and further more preferably 5% or less.

CaO is a component accelerating melting of the glass raw material and improving weather resistance.

In the case where the CaO content is 5% or more, melting property and weather resistance are good and the case is preferable. The CaO content is more preferably 6% or more, further preferably 7% or more, and still more preferably 8% or more. In the case where the CaO content is 12% or less, devitrification hardly occurs and the case is preferable. The CaO content is more preferably 11% or less, and further preferably 10% or less.

The total amount MgO+CaO of MgO and CaO is, for the reasons the same as in the above MgO and CaO, preferably 5% or more, more preferably 6% or more, further preferably 7% or more, and particularly preferably 8% or more. Moreover, the amount is preferably 20% or less, more preferably 19% or less, further preferably 18% or less, further more preferably 17% or less, and particularly preferably 16% or less.

Furthermore, even in the case where SrO or BaO is contained to be mentioned later, similarly, MgO+CaO+SrO+BaO is preferably 5% or more, more preferably 6% or more, further preferably 7% or more, and particularly preferably 8% or more. Moreover, the amount is preferably 20% or less, more preferably 19% or less, further preferably 18% or less, further more preferably 17% or less, and particularly preferably 16% or less.

Na$_2$O is a component accelerating melting of the glass raw material.

In the case where the Na$_2$O content is 5% or more, melting property is good and the case is preferable. The Na$_2$O content is more preferably 8% or more, further preferably 11% or more, and further more preferably 12% or more. In the case where the Na$_2$O content is 18% or less, weather resistance is good and the case is preferable. The Na$_2$O content is more preferably 17% or less, further preferably 16% or less, and further more preferably 15% or less.

K$_2$O is a component accelerating melting of the glass raw material.

The K$_2$O content is 0% or more. In the case where K$_2$O is contained, melting property is good. In the case where the K$_2$O content is 5% or less, weather resistance is good and the case is preferable. The K$_2$O content is more preferably 4% or less, further preferably 3% or less, and further more preferably 2% or less.

The total amount Na$_2$O+K$_2$O of Na$_2$O and K$_2$O is, for the reasons the same as in the above Na$_2$O and K$_2$O, preferably 10% or more, more preferably 11% or more, and further preferably 12% or more. Moreover, the amount is preferably 20% or less, more preferably 19% or less, and further preferably 18% or less.

The heat-ray- and ultraviolet-absorbing glass plate according to the present invention contains iron. Iron is a component lowering Te and is a blue or green coloring component.

Usually, divalent iron and trivalent iron are present in glass. Divalent iron has an absorption peak at a wavelength in the vicinity of 1,100 nm, and trivalent iron has an absorption peak at a wavelength in the vicinity of 400 nm. Accordingly, when attention is focused on the infrared absorptivity, it is preferred that the amount of divalent iron (Fe$_2$+) is larger than that of trivalent iron (Fe$^{3+}$). Therefore, in view of keeping Te low, it is preferred to increase Fe-redox.

In the heat-ray- and ultraviolet-absorbing glass plate according to the present invention, Fe-redox is 50% or more. In the case where Fe-redox is 50% or more, Te can be kept low. Fe-redox is preferably 55% or more, and more preferably 57% or more. On the other hand, in the case where Fe-redox is too high, the melting step of the glass raw material becomes complicated. Fe-redox is preferably 80% or less, more preferably 75% or less, and further preferably 71% or less.

In the heat-ray- and ultraviolet-absorbing glass plate according to the present invention, the content of total iron calculated as Fe$_2$O$_3$ (hereinafter also simply referred to as Fe$_2$O$_3$) is, as represented by mass percentage based on oxides, 0.05% or more. In the case where the Fe$_2$O$_3$ content is 0.05% or more, Te can be kept sufficiently low. The Fe$_2$O$_3$ content is preferably 0.08% or more, more preferably 0.10% or more, further preferably 0.13% or more, further more preferably 0.15% or more, and particularly preferably 0.17% or more. Along with an increase of the Fe$_2$O$_3$ content, Te decreases but Tv also decreases. The Fe$_2$O$_3$ content is 0.35% or less. In the case where the Fe$_2$O$_3$ content is 0.35% or less, the decrease of Tv can be sufficiently suppressed. The Fe$_2$O$_3$ content is preferably 0.32% or less, further preferably 0.31% or less, further more preferably 0.30% or less, especially preferably 0.29% or less, especially more preferably 0.28% or less, and particularly preferably 0.27% or less. Furthermore, the content is particularly more preferably less than 0.25% and is most preferably 0.24% or less.

The heat-ray- and ultraviolet-absorbing glass plate according to the present invention contains tin. Tin has a function of directing Fe-redox into a predetermined range in the present invention and suppresses oxidation of iron (a decrease in Tv/Te) by cerium and reduction of sulfur (amber coloring) by a reducing agent.

The content of total tin calculated as $SnO_2$ (hereinafter sometimes simply referred to as $SnO_2$) is, as represented by mass percentage based on oxides, is 0.02% or more. In the case where $SnO_2$ is 0.02% or more, oxidation of iron by cerium and reduction of sulfur by a reducing agent can be sufficiently suppressed. The $SnO_2$ content is more preferably 0.03% or more, further preferably 0.04% or more, and further more preferably 0.05% or more. The $SnO_2$ content is 0.5% or less. In the case where the $SnO_2$ content is 0.5% or less, volatilization of $SnO_2$ is small and haze of a glass ribbon at the time of forming of a plate glass by a float process can be suppressed. The $SnO_2$ content is preferably 0.45% or less, more preferably 0.4% or less, and further preferably 0.35% or less.

The heat-ray- and ultraviolet-absorbing glass plate according to the present invention contains cerium. Cerium is a component lowering Tuv.

The content of total cerium calculated as $CeO_2$ (hereinafter sometimes simply referred to as $CeO_2$) is, as represented by mass percentage based on oxides, 0.01% or more. In the case where the $CeO_2$ content is 0.01% or more, the ultraviolet transmittance can be sufficiently decreased. The $CeO_2$ content is preferably 0.03% or more, more preferably 0.05% or more, and further preferably 0.07% or more. The $CeO_2$ content is 5% or less. In the case where the $CeO_2$ content is 5% or less, Tv can be made sufficiently high and also, costs can be kept low. The $CeO_2$ content is preferably 4% or less, more preferably 3.5% or less, further preferably 3.4% or less, further more preferably 3.2% or less, and particularly preferably 2.9% or less.

The heat-ray- and ultraviolet-absorbing glass plate according to the present invention contains sulfur. Sulfur derives from, for example, salt cake ($Na_2SO_4$) used as a refining agent.

The content of total sulfur calculated as $SO_3$ (hereinafter sometimes simply referred to as $SO_3$) is, as represented by mass percentage based on oxides, 0.003% or more. In the case where the $SO_3$ content is 0.003% or more, the refining effect at the time of melting glass is good and the amount of bubbles is small. The $SO_3$ content is preferably 0.0035% or more, more preferably 0.004% or more, and further preferably 0.005% or more. The $SO_3$ content is 0.1% or less. In the case where the $SO_3$ content is 0.1% or less, a decrease of Tv by amber coloring can be sufficiently suppressed. The $SO_3$ content is preferably 0.08% or less, more preferably 0.07% or less, further preferably 0.05% or less, and particularly preferably 0.03% or less.

In the heat-ray- and ultraviolet-absorbing glass plate according to the present invention, the mass ratio ($SnO_2/SO_3$) of the $SnO_2$ content to the $SO_3$ content is preferably 0.2 or more. In the case where $SnO_2/SO_3$ is 0.2 or more, amber coloring can be sufficiently suppressed. $SnO_2/SO_3$ is more preferably 1 or more, further preferably 3 or more, further more preferably 5 or more, especially preferably 10 or more, and particularly preferably 15 or more. $SnO_2/SO_3$ is preferably 100 or less. In the case where $SnO_2/SO_3$ is 100 or less, volatilization is small and the cost can be kept low. $SnO_2/SO_3$ is more preferably 70 or less, further preferably 50 or less, and particularly preferably 30 or less.

In the heat-ray- and ultraviolet-absorbing glass plate according to the present invention, the ratio of $SnO_2/SO_3$ to Fe-redox (($SnO_2/SO_3$)/Fe-redox) is preferably 0.0025 or more. In the case where ($SnO_2/SO_3$)/Fe-redox is 0.0025 or more, amber coloring can be sufficiently suppressed. ($SnO_2/SO_3$)/Fe-redox is more preferably 0.05 or more, further preferably 0.08 or more, particularly preferably 0.15 or more, and most preferably 0.2 or more. ($SnO_2/SO_3$)/Fe-redox is preferably 5 or less. In the case where ($SnO_2/SO_3$)/Fe-redox is 5 or less, Te is suppressed, volatilization is small, and the cost can be kept low. ($SnO_2/SO_3$)/Fe-redox is more preferably 3 or less, further preferably 2 or less, particularly preferably 1.5 or less, most preferably 1 or less.

In the heat-ray- and ultraviolet-absorbing glass plate according to the present invention, when the relationship among Fe-redox, total iron calculated as $Fe_2O_3$, total tin calculated as $SnO_2$, total sulfur calculated as $SO_3$, and total cerium calculated as $CeO_2$ is represented as the N value shown in the following, the N value is preferably 0 or more. In the case where the N value is 0 or more, amber coloring is sufficiently suppressed, and Fe-redox can be maintained high. The N value is more preferably 0.2 or more, further preferably 0.5 or more, and particularly preferably 1 or more. The N value is preferably 7 or less, more preferably 6 or less, and further preferably 5 or less.

N value=(mass of divalent iron calculated as $Fe_2O_3$)−40×(total iron calculated as $Fe_2O_3$)−6×(total tin calculated as $SnO_2$)+5×(total sulfur calculated as $SO_3$)+(total cerium calculated as $CeO_2$)+14 provided that the mass of divalent iron calculated as $Fe_2O_3$ is the product of Fe-redox and total iron of calculated as $Fe_2O_3$.

A heat-ray- and ultraviolet-absorbing glass plate is sometimes required that the transmitted light has a color tone near to achromatic color (gray), that is, the excitation purity Pe (hereinafter also referred to as Pe) as defined in JIS Z 8701 (1999) is low, so that an object or view can be seen in colors close to the actual colors when the object or view is seen through the glass plate.

The heat-ray- and ultraviolet-absorbing glass plate according to the present invention may contain selenium in order to keep Pe low. Selenium is a red coloring component, and can keep Pe low when used together with cobalt.

The Se content as represented by mass percentage based on Se is preferably 0.0001% or more. In the case where the Se content is 0.0001% or more, Pe can be made sufficiently low. The Se content is more preferably 0.0002% or more, further preferably 0.0003% or more, and particularly preferably 0.00035% or more. The Se content is preferably 0.0050% or less. In the case where the Se content is 0.0050% or less, Tv can be made sufficiently high. The Se content is more preferably 0.0040% or less, further preferably 0.0030% or less, further more preferably 0.0020% or less, and particularly preferably 0.0010% or less.

The heat-ray- and ultraviolet-absorbing glass plate according to the present invention may further contain cobalt in order to keep Pe low. Cobalt is a blue coloring component, and can keep Pe low when used together with selenium.

The content of total cobalt calculated as CoO (hereinafter sometimes simply referred to as CoO) is, as represented by mass percentage based on oxides, preferably 0.00005% or more. In the case where the CoO content is 0.00005% or more, Pe can be made sufficiently low. The CoO content is more preferably 0.00007% or more, further preferably 0.00008% or more, and particularly preferably 0.0001% or more. The CoO content is preferably 0.0030% or less. In the case where the CoO content is 0.0030% or less, Tv can be made sufficiently high. The CoO content is more preferably 0.0025% or less, further preferably 0.0023% or less, and particularly preferably 0.002% or less.

The heat-ray- and ultraviolet-absorbing glass plate according to the present invention may contain SrO. SrO is a component accelerating melting of the glass raw material.

The SrO content is, as represented by mass percentage based on oxides, preferably from 0 to 5%. In the case where the SrO content is 5% or less, it is possible to sufficiently accelerate melting of the glass raw material. The SrO content is more preferably 3% or less, further preferably 2% or less, further more preferably 1% or less, and particularly preferably 0.5% or less.

The heat-ray- and ultraviolet-absorbing glass plate according to the present invention may contain BaO. BaO is a component accelerating melting of the glass raw material.

The BaO content is, as represented by mass percentage based on oxides, preferably from 0 to 5%. In the case where the BaO content is 5% or less, it is possible to sufficiently accelerate melting of the glass raw material. The BaO content is more preferably 3% or less, further preferably 2% or less, further more preferably 1% or less, and particularly preferably 0.5% or less.

The heat-ray- and ultraviolet-absorbing glass plate according to the present invention may contain $TiO_2$. $TiO_2$ is a component lowering the ultraviolet transmittance and is a green or yellow coloring component. In the case where the $TiO_2$ content as represented by mass percentage based on oxides is 0.8% or less, Tv can be made sufficiently high. The $TiO_2$ content is more preferably 0.7% or less, and further preferably 0.6% or less.

In the case of obtaining a glass plate which provides a transmitted light having a blue or green color tone, the heat-ray- and ultraviolet-absorbing glass plate according to the present invention may contain substantially no $TiO_2$. The phrase "contain substantially no" means that it is not contained except for as an unavoidable impurity (the same shall apply hereinafter).

The heat-ray- and ultraviolet-absorbing glass plate according to the present invention may contain $ZrO_2$ in a content of up to 0.1% as the case requires. $ZrO_2$ is a component improving elastic modulus of glass. The content is preferably 0.05% or less, and more preferably 0.02% or less.

The heat-ray- and ultraviolet-absorbing glass plate according to the present invention preferably contains substantially no other coloring components ($V_2O_5$, CuO, $Cr_2O_3$, NiO, MnO, etc.). If they are contained, Tv decreases and Tv/Te decreases.

The heat-ray- and ultraviolet-absorbing glass plate according to the present invention may contain $Sb_2O_3$ and $As_2O_3$ as other refining agents in a total amount of up to 0.3% as the case requires. The total amount is preferably 0.2% or less, and more preferably 0.1% or less. However, it is preferred that such components are substantially not contained when the environmental burden is considered.

The heat-ray- and ultraviolet-absorbing glass plate according to the present invention has a specific gravity of preferably 2.48 or more, and more preferably 2.50 or more. Moreover, the specific gravity is preferably 2.65 or less, and more preferably 2.63 or less. In the case where the specific gravity of the heat-ray- and ultraviolet-absorbing glass plate according to the present invention is adjusted to be similar level to that of conventional soda lime silica glass, the efficiency for the change of the composition (i.e. the change of the glass base) at the time of production can be improved.

The specific gravity of the heat-ray- and ultraviolet-absorbing glass plate according to the present invention can be adjusted by adjusting the glass composition. In order to obtain the above specific gravity, the mass ratio of $SiO_2$/(MgO+CaO) is adjusted to be preferably 4.0 or more, and more preferably 4.5 or more. Moreover, the mass ratio of $SiO_2$/(MgO+CaO) is adjusted to be preferably 9.0 or less, more preferably 8.7 or less, further preferably 8.5 or less, and particularly preferably 8.3 or less.

Furthermore, also in the case where SrO and/or BaO is contained, the mass ratio of $SiO_2$/(MgO+CaO+SrO+BaO) is likewise adjusted to be preferably 4.0 or more, and more preferably 4.5 or more. Moreover, the mass ratio of $SiO_2$/(MgO+CaO+SrO+BaO) is adjusted to be preferably 9.0 or less, more preferably 8.7 or less, further preferably 8.5 or less, and particularly preferably 8.3 or less.

The heat-ray- and ultraviolet-absorbing glass plate according to the present invention has Tv of 66% or more as a value calculated as 4 mm thickness of the glass plate. In the case where Tv is 66% or more, a high visible light transmittance required for a heat-ray- and ultraviolet-absorbing glass plate which provides a transmitted light having a light gray color tone is sufficiently satisfied. Tv as a value calculated as 4 mm thickness of the glass plate is preferably 67% or more, more preferably 68% or more, further preferably 69% or more, and particularly preferably 70% or more.

The heat-ray- and ultraviolet-absorbing glass plate according to the present invention has Te of 65% or less as a value calculated as 4 mm thickness of the glass plate. In the case where Te is 65% or less, a low solar transmittance required for a heat-ray- and ultraviolet-absorbing glass plate is sufficiently satisfied. Te as a value calculated as 4 mm thickness of the glass plate is preferably 62% or less, more preferably 60% or less, further preferably 58% or less, and particularly preferably 55% or less.

Tv/Te of the heat-ray- and ultraviolet-absorbing glass plate according to the present invention is 1.3 or more as a value calculated as 4 mm thickness of the glass plate. In the case where Tv/Te is 1.3 or more, a low solar transmittance and a high visible light transmittance can be simultaneously satisfied. Tv/Te as a value calculated as 4 mm thickness of the glass plate is preferably 1.32 or more, more preferably 1.34 or more, further preferably 1.36 or more, and particularly preferably 1.38 or more.

The heat-ray- and ultraviolet-absorbing glass plate according to the present invention has Tuv of 50% or less as a value calculated as 4 mm thickness of the glass plate. In the case where Tuv is 50% or less, a low ultraviolet transmittance required for a heat-ray- and ultraviolet-absorbing glass plate is sufficiently satisfied. Tuv as a value calculated as 4 mm thickness of the glass plate is preferably 48% or less, more preferably 46% or less, further preferably 45% or less, further more preferably 44% or less, and particularly preferably 42% or less.

The heat-ray- and ultraviolet-absorbing glass plate according to the present invention has Pe of preferably 3% or less as a value calculated as 4 mm thickness of the glass plate. In the case where Pe is 3% or less, a transmitted light through the heat-ray- and ultraviolet-absorbing glass plate has a color tone near to achromatic color (gray). Pe as a value calculated as 4 mm thickness of the glass plate is more preferably 2.8% or less, further preferably 2.7% or less, further more preferably 2.5% or less, and especially preferably 2.4% or less. Furthermore, it is still further preferably 2.2% or less, particularly preferably 2.0% or less, and most preferably 1.8% or less.

The heat-ray- and ultraviolet-absorbing glass plate according to the present invention has a dominant wavelength Dw of the transmitted light therethrough (hereinafter also referred to as Dw) being preferably 570 nm or less as a value calculated as 4 mm thickness of the glass plate. In the case where Dw is 570 nm or less, a glass plate which provides a transmitted light having a blue or green color tone can be obtained. Dw as a value calculated as 4 mm thickness of the glass plate is more preferably 550 nm or less, further preferably 540 nm or less, further more preferably 530 nm or less, particularly preferably 525 nm or less, and more particularly preferably 520 nm or less. Dw is preferably 400 nm or more as a value calculated as 4 mm thickness of the glass plate. In the case where Dw is 400 nm or more, bluishness can be suppressed. Dw is more preferably 420 nm or more, further preferably 440 nm or more, further more preferably 460 nm or more, and particularly preferably 480 nm or more.

The heat-ray- and ultraviolet-absorbing glass plate according to the present invention has a color degree a* of the transmitted light therethrough (hereinafter also referred to as a*) being preferably 2 or less as a value calculated as 4 mm thickness of the glass plate. In the case where a* is 2 or less, it is not recognized as red. a* as a value calculated as 4 mm thickness of the glass plate is more preferably 1.0 or less, further preferably 0.5 or less, and further more preferably 0.2 or less. a* is preferably −10 or more as a value calculated as 4 mm thickness of the glass plate. In the case where a* is −10 or more, a green color tone is not provided. It is more preferably −9.0 or more, further preferably −8.0 or more, further more preferably −7.0 or more, especially preferably −6.0 or more, and particularly preferably −5.0 or more. Furthermore, it is still further preferably −4.0 or more, and most preferably −3.0 or more.

The heat-ray- and ultraviolet-absorbing glass plate according to the present invention has a color degree b* of the transmitted light therethrough (hereinafter also referred to as b*) is preferably 6 or less as a value calculated as 4 mm thickness of the glass plate. In the case where b* is 6 or less, it is not recognized as yellow. b* as a value calculated as 4 mm thickness of the glass plate is more preferably 5.0 or less, further preferably 4.0 or less, further more preferably 3.5 or less, and especially preferably 3.0 or less. b* is preferably −4 or more as a value calculated as 4 mm thickness of the glass plate. In the case where b* is −4 or more, a blue color tone is not provided. It is more preferably −3.0 or more, further preferably −2.0 or more, and further more preferably −1.5 or more.

The heat-ray- and ultraviolet-absorbing glass plate according to the present invention has a color degree c.* of the transmitted light therethrough (hereinafter also referred to as c*), which is calculated from $c^* = (a^{*2} + b^{*2})^{1/2}$, being preferably 8.0 or less as a value calculated as 4 mm thickness of the glass plate. In the case where c* is 8.0 or less, chroma can be suppressed low and color cannot be recognized. c* as a value calculated as 4 mm thickness of the glass plate is more preferably 6.5 or less, further preferably 5.0 or less, still more preferably 4.0 or less, and especially preferably 3.5 or less.

The heat-ray- and ultraviolet-absorbing glass plate according to the present invention has a L* of the transmitted light therethrough (hereinafter also referred to as L*) being preferably 80 or more as a value calculated as 4 mm thickness of the glass plate. In the case where L* is 80 or more, high L* required for a heat-ray- and ultraviolet-absorbing glass plate which provides a transmitted light having a light gray color tone is sufficiently satisfied. L* as a value calculated as 4 mm thickness of the glass plate is more preferably 82 or more, further preferably 84 or more, and further more preferably 85 or more.

In the heat-ray- and ultraviolet-absorbing glass plate according to the present invention, the temperature $T_2$ at which the viscosity reaches $10^2$ poises (dPa·s) (hereinafter also referred to as $T_2$) is preferably from 1,350° C. to 1,700° C. In the case where $T_2$ is lower than 1,350° C., the viscosity of the molten glass decreases and there is a possibility that the production becomes unstable. In the case where it is higher than 1,700° C., it becomes difficult to melt the glass and there is a possibility that clarity is influenced. $T_2$ is more preferably 1,360° C. or higher, further preferably 1,370° C. or higher, and particularly preferably 1,380° C. or higher. Also, $T_2$ is more preferably 1,690° C. or lower, further preferably 1,680° C. or lower, and particularly preferably 1,670° C. or lower.

The heat-ray- and ultraviolet-absorbing glass plate according to the present invention contains a small amount of bubbles. The bubble evaluation in the present invention is performed by determining bubble density in the following bubble evaluation test.

(Bubble Evaluation Test)

Cullet granules are charged into a platinum-made crucible and melted at two-stage temperature, and, after cooling the molten glass, bubble density in the glass is determined.

The cullet granules are prepared by melting raw materials so as to achieve a target glass composition, crushing the resultant glass, and sieving to obtain cullet granules having a size of 1 mm or less.

The charge of the cullet granules into the platinum crucible is performed so that the depth of the molten glass in the crucible becomes 2 cm at the time of melting at the two-stage temperature.

The melting at the two-stage temperature is performed so that melting is performed at 1,350° C. for 30 minutes and then melting is performed at 1,600° C. for 30 minutes.

The cooling of the molten glass is performed by cooling it so as to be 500 to 700° C. within 5 minutes and then cooling it to room temperature (25°) at a rate of 1° C./min.

The bubble density is determined by measuring the number of bubbles remaining in the glass and calculating the bubble density (number of bubbles/g).

The bubble density (number of bubbles/g) of the heat-ray- and ultraviolet-absorbing glass plate according to the present invention is preferably 8,000/g or less, more preferably 7,000/g or less, and further preferably 6,500/g or less.

The heat-ray- and ultraviolet-absorbing glass plate according to the present invention can be used either for vehicles or for building, and is particularly suitable as glass for vehicles. In the case where it is used as window glass for an automobile, as the case requires, it may be used as a laminated glass having an interlayer sandwiching a plurality of glass plates, a glass obtained by processing a flat glass to have a curved surface, or a glass having been subjected to a strengthening treatment. Furthermore, in the case where it is used as double glazing for building, it may be used as double glazing composed of two sheets of the heat-ray- and ultra-violet-absorbing glass plates of the present invention or as double glazing composed of the heat-ray- and ultraviolet-absorbing glass plate of the present invention and another glass plate.

The heat-ray- and ultraviolet-absorbing glass plate according to the present invention can be produced, for example, through the following steps (i) to (v).

(i) A glass raw material is prepared by mixing glass matrix materials such as silica sand and others, coloring component materials such as an iron source and a cerium source, a reducing agent, a refining agent, and the like so as to achieve a target glass composition.

(ii) The glass raw material is supplied to a melting furnace, heated to a temperature of from 1,400° C. to 1,550° C. by heavy oil, natural gas, electric melting, or the like, and melted to form molten glass.

(iii) The molten glass is refined in the melting furnace or a refining apparatus and then, formed into a glass plate having a predetermined thickness by a glass plate-forming apparatus of a float process or the like.

(iv) The glass plate is annealed and then cut into a predetermined size.

(v) As the case requires, the cut glass plate may be subjected to a strengthening treatment, may be processed into laminated glass, or may be processed into double glazing.

Examples of the glass matrix material include those used as materials for conventional soda lime silica glass, such as silica sand, soda ash, limestone, and feldspar.

Examples of the iron source include iron powder, iron oxide powder, and red iron oxide.

Examples of cerium source include cerium oxide.

Examples of the tin source include tin oxide.

Examples of the selenium source include sodium selenite.

Examples of the cobalt source include cobalt oxide.

Examples of the reducing agent include carbon, coke and slag. The reducing agent is used for suppressing oxidation of iron in the molten glass and for adjusting Fe-redox to a target level.

In addition, salt cake ($Na_2SO_4$) is used as a refining agent.

In the above-described heat-ray- and ultraviolet-absorbing glass plate according to the present invention, since it contains sulfur derived from salt cake ($Na_2SO_4$), the amount of bubbles is small.

Moreover, since it contains cerium, a low visible light transmittance can be satisfied. Specifically, Tuv can be adjusted to 50% or less as a value calculated as 4 mm thickness of the glass plate.

Furthermore, since it contains tin, amber coloring due to the reduction of sulfur can be suppressed even in the case where Fe-redox is 50% or more, and simultaneously, the oxidation of iron due to cerium can be suppressed. As a result, a low solar transmittance and a high visible light transmittance can be simultaneously satisfied. Specifically, Tv can be adjusted to 66% or more as a value calculated as 4 mm thickness of the glass plate, Te can be adjusted to 65% or less as a value calculated as 4 mm thickness of the glass plate, Tv/Te can be adjusted to 1.3 or more as a value calculated as 4 mm thickness of the glass plate, and Tuv can be adjusted to 50% or less as a value calculated as 4 mm thickness of the glass plate.

Furthermore, in the case where it contains selenium and cobalt, the excitation purity is low. Specifically, Pe can be controlled to 3% or less as a value calculated as 4 mm thickness of the glass plate.

EXAMPLES

Now, the present invention will be described in further detail with reference to Working Examples. However, the present invention is not restricted to such examples.

Examples 1 to 23 and Examples 29 to 37 are Working Examples and Examples 24 to 28 are Comparative Examples.

(Fe-Redox)

With respect to the obtained glass plates, Fe-Redox was calculated from a spectral curve of the glass measured by a spectrophotometer.

(Tv)

With respect to the obtained glass plates, the visible light transmittance Tv (a value under measuring conditions of illuminant A and 2° visual field) as defined in JIS R 3106 (1998) was determined as a value calculated as 4 mm thickness.

(Te)

With respect to the obtained glass plates, the solar transmittance Te as defined in JIS R 3106 (1998) was determined as a value calculated as 4 mm thickness.

(Tuv)

With respect to the obtained glass plates, the ultraviolet transmittance Tuv as defined in ISO 9050 (2003) was determined as a value calculated as 4 mm thickness.

(Pe)

With respect to the obtained glass plates, the excitation purity Pe as defined in JIS Z 8701 (1999) was determined as a value calculated as 4 mm thickness.

(Dw)

With respect to the obtained glass plates, the dominant wavelength Dw of the transmitted light as defined in JIS Z 8701 (1999) was determined as a value calculated as 4 mm thickness.

(SDF)

With respect to the obtained glass plates, SDF as defined in ISO 9050 (2003) was determined as a value calculated as 4 mm thickness.

(Bubble Density)

With respect to the glass compositions shown in Tables 1 to 6, the bubble density was determined through calculation by the aforementioned bubble evaluation test.

Examples 1 to 23 and 29 to 37

Various glass matrix materials such as silica sand, coke, coloring component materials such as an iron source, $SnO_2$, and salt cake ($Na_2SO_4$) were mixed so as to achieve the glass compositions shown in Tables 1 to 6 to prepare glass raw materials. Each glass raw material was put into a crucible and heated at 1,500° C. for 2 hours to form molten glass. The molten glass was cast on a carbon plate and cooled. Both surfaces of the obtained plate-form glass were polished to obtain a glass plate having a thickness of 4 mm. With respect to the glass plate, the transmittance was measured every 1 nm by using a spectrophotometer (manufactured by Perkin Elmer Co., Ltd., Lambda 950) to determine Te, Tv, Tuv, SDF, Pe, and Dw. The results are shown in Tables 1 to 6.

In Examples 1 to 23 and 29 to 37, $T_2$ falls within the range of from 1,400 to 1,580° C.

Examples 24 to 28

In Example 24, a glass plate having a thickness of 4 mm was obtained in the same manner as in Example 1 except that a glass raw material was prepared so as to achieve the glass composition shown in Table 4.

Example 25 was cited from Example described in Patent Document 4, Example 26 was cited from Example described in Patent Document 1, Example 27 was cited from Example described in Patent Document 5, and Example 28 was cited from Example described in Patent Document 3. Cited contents are shown in Table 4. In Patent Documents 4 and 1 that are citation sources of Examples 25 and 26, LTA and TSET were employed as indices of the visible light transmittance and the solar transmittance, respectively, and comparison was made considering that LTA and TSET were regarded as being equal to Tv and Te, respectively. Incidentally, the optical values of Examples 25 and 26 are values at a thickness of 3.9 mm as described in Patent Documents 4 and 1.

TABLE 1

| | | Ex. 1 | Ex. 2 | Ex. 3 | Ex. 4 | Ex. 5 | Ex. 6 | Ex. 7 |
|---|---|---|---|---|---|---|---|---|
| Composition (%) | $SiO_2$ | 69.7 | 69.7 | 69.7 | 69.7 | 69.7 | 69.7 | 69.7 |
| | $Al_2O_3$ | 3.5 | 3.5 | 3.5 | 3.5 | 3.5 | 3.5 | 3.5 |
| | MgO | 0.33 | 0.33 | 0.33 | 0.33 | 0.33 | 0.33 | 0.33 |
| | CaO | 9.6 | 9.6 | 9.6 | 9.6 | 9.6 | 9.6 | 9.6 |
| | $Na_2O$ | 14.6 | 14.6 | 14.6 | 14.6 | 14.6 | 14.6 | 14.6 |
| | $K_2O$ | 1.5 | 1.5 | 1.5 | 1.5 | 1.5 | 1.5 | 1.5 |
| | $CeO_2$ | 0.30 | 0.30 | 0.25 | 0.25 | 0.60 | 0.60 | 0.60 |
| | $Fe_2O_3$ | 0.30 | 0.25 | 0.30 | 0.25 | 0.27 | 0.27 | 0.27 |
| | $SnO_2$ | 0.22 | 0.22 | 0.22 | 0.22 | 0.22 | 0.22 | 0.22 |
| | CoO | 0.00013 | 0.00020 | 0.00011 | 0.00008 | 0.00019 | 0.00014 | 0.00000 |
| | Se | 0.00062 | 0.00066 | 0.00062 | 0.00064 | 0.00070 | 0.00067 | 0.00066 |
| | $TiO_2$ | 0.00 | 0.00 | 0.00 | 0.00 | 0.00 | 0.00 | 0.00 |
| | $SO_3$ | 0.0050 | 0.0050 | 0.0050 | 0.0050 | 0.0050 | 0.0050 | 0.0050 |
| $SiO_2$/(MgO + CaO) | | 7.0 | 7.0 | 7.0 | 7.0 | 7.0 | 7.0 | 7.0 |
| $SiO_2$/(MgO + CaO + SrO + BaO) | | 7.0 | 7.0 | 7.0 | 7.0 | 7.0 | 7.0 | 7.0 |
| $Na_2O + K_2O$ | | 16.1 | 16.1 | 16.1 | 16.1 | 16.1 | 16.1 | 16.1 |
| MgO + CaO | | 9.9 | 9.9 | 9.9 | 9.9 | 9.9 | 9.9 | 9.9 |
| MgO + CaO + SrO + BaO | | 9.9 | 9.9 | 9.9 | 9.9 | 9.9 | 9.9 | 9.9 |
| Fe-redox (%) | | 59.9 | 65.9 | 66.6 | 68.2 | 58.0 | 62.8 | 62.1 |
| $SnO_2/SO_3$ | | 44.7 | 44.7 | 44.7 | 44.7 | 44.7 | 44.7 | 44.7 |
| $(SnO_2/SO_3)$/Fe-redox | | 0.75 | 0.68 | 0.67 | 0.66 | 0.77 | 0.71 | 0.72 |
| Tv (%) | | 71.2 | 72.3 | 70.9 | 72.9 | 70.4 | 70.4 | 71.8 |
| Te (%) | | 46.0 | 48.0 | 44.0 | 47.6 | 50.9 | 48.0 | 47.1 |
| Tuv (%) | | 29.3 | 30.9 | 31.1 | 32.0 | 23.2 | 24.3 | 25.5 |
| SDF (%) | | 6.9 | 7.2 | 7.2 | 7.5 | 5.6 | 5.8 | 6.1 |
| Dw (nm) | | 535 | 511 | 502 | 508 | 568 | 558 | 541 |
| Pe (%) | | 1.2 | 1.0 | 1.3 | 1.0 | 1.5 | 1.1 | 2.3 |
| Tv/Te | | 1.49 | 1.45 | 1.54 | 1.47 | 1.36 | 1.42 | 1.47 |
| N value | | 1.16 | 3.15 | 1.13 | 3.10 | 2.64 | 2.65 | 2.65 |
| Bubble density (/g) | | 5000 | 5000 | 5000 | 5000 | 5000 | 5000 | 5000 |
| L* | | 87.6 | 88.1 | 87.4 | 88.4 | 87.2 | 87.2 | 87.9 |
| a* | | −3.52 | −3.33 | −4.08 | −3.62 | −2.11 | −2.69 | −3.26 |
| b* | | 1.83 | 1.00 | 0.67 | 0.95 | 3.67 | 2.58 | 1.90 |
| c* | | 3.96 | 3.47 | 4.13 | 3.74 | 4.23 | 3.73 | 3.78 |

TABLE 2

| | | Ex. 8 | Ex. 9 | Ex. 10 | Ex. 11 | Ex. 12 | Ex. 13 | Ex. 14 |
|---|---|---|---|---|---|---|---|---|
| Composition (%) | $SiO_2$ | 69.7 | 69.7 | 69.7 | 69.7 | 69.7 | 69.7 | 69.7 |
| | $Al_2O_3$ | 3.5 | 3.5 | 3.5 | 3.5 | 3.5 | 3.5 | 3.5 |
| | MgO | 0.33 | 0.33 | 0.33 | 0.33 | 0.33 | 0.33 | 0.33 |
| | CaO | 9.6 | 9.6 | 9.6 | 9.6 | 9.6 | 9.6 | 9.6 |
| | $Na_2O$ | 14.6 | 14.6 | 14.6 | 14.6 | 14.6 | 14.6 | 14.6 |
| | $K_2O$ | 1.5 | 1.5 | 1.5 | 1.5 | 1.5 | 1.5 | 1.5 |
| | $CeO_2$ | 0.60 | 0.60 | 0.60 | 0.60 | 0.60 | 0.60 | 0.60 |
| | $Fe_2O_3$ | 0.27 | 0.27 | 0.27 | 0.27 | 0.27 | 0.27 | 0.27 |
| | $SnO_2$ | 0.22 | 0.22 | 0.22 | 0.22 | 0.22 | 0.22 | 0.22 |
| | CoO | 0.00010 | 0.00028 | 0.00011 | 0.00012 | 0.00010 | 0.00010 | 0.00011 |
| | Se | 0.00060 | 0.00050 | 0.00059 | 0.00053 | 0.00031 | 0.00030 | 0.00031 |
| | $TiO_2$ | 0.00 | 0.00 | 0.16 | 0.16 | 0.16 | 0.16 | 0.16 |
| | $SO_3$ | 0.0050 | 0.0050 | 0.0050 | 0.0050 | 0.0050 | 0.0050 | 0.0100 |
| $SiO_2$/(MgO + CaO) | | 7.0 | 7.0 | 7.0 | 7.0 | 7.0 | 7.0 | 7.0 |
| $SiO_2$/(MgO + CaO + SrO + BaO) | | 7.0 | 7.0 | 7.0 | 7.0 | 7.0 | 7.0 | 7.0 |
| $Na_2O + K_2O$ | | 16.1 | 16.1 | 16.1 | 16.1 | 16.1 | 16.1 | 16.1 |
| MgO + CaO | | 9.9 | 9.9 | 9.9 | 9.9 | 9.9 | 9.9 | 9.9 |
| MgO + CaO + SrO + BaO | | 9.9 | 9.9 | 9.9 | 9.9 | 9.9 | 9.9 | 9.9 |
| Fe-redox (%) | | 67.6 | 70.8 | 62.0 | 62.6 | 72.4 | 71.5 | 72.4 |
| $SnO_2/SO_3$ | | 44.7 | 44.7 | 44.7 | 44.7 | 44.7 | 44.7 | 22.3 |
| $(SnO_2/SO_3)$/Fe-redox | | 0.66 | 0.63 | 0.72 | 0.71 | 0.62 | 0.63 | 0.31 |
| Tv (%) | | 72.1 | 72.2 | 72.3 | 72.6 | 75.0 | 74.8 | 74.7 |
| Te (%) | | 48.0 | 47.5 | 45.9 | 45.1 | 48.5 | 48.2 | 45.4 |
| Tuv (%) | | 25.2 | 25.7 | 24.3 | 24.4 | 25.1 | 24.8 | 25.0 |
| SDF (%) | | 6.0 | 6.1 | 5.9 | 5.9 | 6.0 | 6.0 | 6.0 |
| Dw (nm) | | 536 | 504 | 514 | 504 | 499 | 499 | 501 |
| Pe (%) | | 3.0 | 1.3 | 1.2 | 1.2 | 1.2 | 1.6 | 1.9 |
| Tv/Te | | 1.45 | 1.47 | 1.51 | 1.54 | 1.49 | 1.49 | 1.58 |

TABLE 2-continued

|  | Ex. 8 | Ex. 9 | Ex. 10 | Ex. 11 | Ex. 12 | Ex. 13 | Ex. 14 |
|---|---|---|---|---|---|---|---|
| N value | 2.67 | 2.68 | 2.65 | 2.65 | 2.68 | 2.68 | 2.70 |
| Bubble density (/g) | 5000 | 5000 | 5000 | 5000 | 5000 | 5000 | 3000 |
| L* | 88.0 | 88.1 | 88.1 | 88.2 | 89.4 | 89.3 | 89.2 |
| a* | −3.28 | −3.59 | −4.12 | −4.61 | −4.48 | −4.56 | −6.02 |
| b* | 1.73 | 0.72 | 1.38 | 0.90 | 0.34 | 0.34 | 0.84 |
| c* | 3.71 | 3.66 | 4.34 | 4.70 | 4.49 | 4.58 | 6.08 |

TABLE 3

|  |  | Ex. 15 | Ex. 16 | Ex. 17 | Ex. 18 | Ex. 19 | Ex. 20 | Ex. 21 |
|---|---|---|---|---|---|---|---|---|
| Composition (%) | $SiO_2$ | 69.7 | 72.4 | 72.4 | 72.4 | 72.4 | 72.4 | 72.4 |
|  | $Al_2O_3$ | 3.5 | 0.45 | 0.45 | 0.45 | 0.45 | 0.45 | 0.45 |
|  | MgO | 0.33 | 4.2 | 4.2 | 4.2 | 4.2 | 4.2 | 4.2 |
|  | CaO | 9.6 | 8.9 | 8.9 | 8.9 | 8.9 | 8.9 | 8.9 |
|  | $Na_2O$ | 14.6 | 13.4 | 13.4 | 13.4 | 13.4 | 13.4 | 13.4 |
|  | $K_2O$ | 1.5 | 0.090 | 0.090 | 0.090 | 0.090 | 0.090 | 0.090 |
|  | $CeO_2$ | 0.60 | 0.090 | 0.090 | 0.090 | 0.090 | 0.090 | 0.090 |
|  | $Fe_2O_3$ | 0.27 | 0.22 | 0.22 | 0.22 | 0.22 | 0.22 | 0.22 |
|  | $SnO_2$ | 0.22 | 0.22 | 0.22 | 0.22 | 0.22 | 0.22 | 0.22 |
|  | CoO | 0.00014 | 0.00017 | 0.00013 | 0.00010 | 0.00000 | 0.00015 | 0.00000 |
|  | Se | 0.00033 | 0.00066 | 0.00071 | 0.00080 | 0.00070 | 0.00061 | 0.00054 |
|  | $TiO_2$ | 0.16 | 0.00 | 0.00 | 0.00 | 0.00 | 0.00 | 0.00 |
|  | $SO_3$ | 0.0080 | 0.0050 | 0.0050 | 0.0050 | 0.0050 | 0.0050 | 0.0100 |
| $SiO_2$/(MgO + CaO) |  | 7.0 | 5.5 | 5.5 | 5.5 | 5.5 | 5.5 | 5.5 |
| $SiO_2$/(MgO + CaO + SrO + BaO) |  | 7.0 | 5.5 | 5.5 | 5.5 | 5.5 | 5.5 | 5.5 |
| $Na_2O + K_2O$ |  | 16.1 | 13.5 | 13.5 | 13.5 | 13.5 | 13.5 | 13.5 |
| MgO + CaO |  | 9.9 | 13.1 | 13.1 | 13.1 | 13.1 | 13.1 | 13.1 |
| MgO + CaO + SrO + BaO |  | 9.9 | 13.1 | 131 | 13.1 | 13.1 | 13.1 | 13.1 |
| Fe-redox (%) |  | 71.5 | 72.3 | 70.2 | 72.9 | 62.9 | 61.4 | 69.9 |
| $SnO_2/SO_3$ |  | 27.9 | 44.7 | 44.7 | 44.7 | 44.7 | 44.7 | 22.3 |
| $(SnO_2/SO_3)$/Fe-redox |  | 0.39 | 0.62 | 0.64 | 0.61 | 0.71 | 0.73 | 0.32 |
| Tv (%) |  | 75.3 | 74.6 | 74.2 | 73.7 | 73.7 | 74.3 | 75.9 |
| Te (%) |  | 46.0 | 50.2 | 50.6 | 49.6 | 52.4 | 53.0 | 51.2 |
| Tuv (%) |  | 25.4 | 41.5 | 41.0 | 40.9 | 39.6 | 39.0 | 41.9 |
| SDF (%) |  | 6.1 | 9.8 | 9.7 | 9.7 | 9.4 | 9.2 | 9.9 |
| Dw (nm) |  | 496 | 494 | 496 | 496 | 510 | 505 | 496 |
| Pe (%) |  | 1.9 | 2.3 | 2.8 | 2.5 | 2.0 | 2.0 | 1.0 |
| Tv/Te |  | 1.57 | 1.43 | 1.42 | 1.43 | 1.37 | 1.36 | 1.43 |
| N value |  | 2.69 | 1.13 | 4.13 | 1.13 | 4.11 | 4.11 | 4.15 |
| Bubble density (/g) |  | 4000 | 5000 | 5000 | 5000 | 5000 | 5000 | 3000 |
| L* |  | 89.5 | 89.2 | 89.0 | 88.7 | 88.8 | 89.0 | 89.8 |
| a* |  | −5.69 | −4.16 | −3.93 | −4.02 | −3.35 | −3.55 | −4.58 |
| b* |  | −0.12 | −0.60 | −0.18 | −0.06 | 0.97 | 0.76 | −0.08 |
| c* |  | 5.69 | 4.20 | 3.93 | 4.02 | 3.49 | 3.63 | 4.58 |

TABLE 4

|  |  | Ex. 22 | Ex. 23 | Ex. 24 | Ex. 25 | Ex. 26 | Ex. 27 | Ex. 28 |
|---|---|---|---|---|---|---|---|---|
| Composition (%) | $SiO_2$ | 72.4 | 70.6 | 70.5 | 72.1 | 72.5 | 67-75 | 70 |
|  | $Al_2O_3$ | 0.45 | 3.30 | 3.2 | 0.2 | 0.13 | 0-7 | 1.8 |
|  | MgO | 4.2 | 0.1 | 0.1 | 3.8 | 3.8 | 0-7 | 4 |
|  | CaO | 8.9 | 9.3 | 9.4 | 8.8 | 8.8 | 5-15 | 8.5 |
|  | $Na_2O$ | 13.4 | 14.3 | 14.6 | 13.6 | 13.8 | 10-20 | 12.5 |
|  | $K_2O$ | 0.090 | 1.500 | 1.5 | 0.1 |  | 0-7 | 0.3 |
|  | $CeO_2$ | 0.090 | 2.700 |  |  |  |  | 1.25 |
|  | $Fe_2O_3$ | 0.22 | 0.27 | 0.39 | 0.366 | 0.65 | 0.46 | 0.403 |
|  | $SnO_2$ | 0.22 | 0.22 | 0.2 |  |  |  |  |
|  | CoO | 0.00011 | 0.00150 | 0.00250 |  | 0.00200 |  | 0.00180 |
|  | Se | 0.00055 | 0.00070 | 0.00090 | 0.00050 | 0.00035 | 0.00050 | 0.00090 |
|  | $TiO_2$ | 0.16 | 0.49 |  | 0.021 |  | 0.1 | 1.1 |
|  | $SO_3$ | 0.0060 | 0.0050 | 0.0200 | 0.0790 |  |  |  |
|  | $Cr_2O_3$ |  |  |  | 0.0006 |  |  |  |
|  | MnO |  |  |  | 0.0021 |  |  |  |
|  | $Co_3O_4$ |  |  |  |  |  | 0.002 |  |
| $SiO_2$/(MgO + CaO) |  | 5.5 | 7.5 | 7.4 | 5.7 | 5.8 | — | 5.6 |

TABLE 4-continued

|  | Ex. 22 | Ex. 23 | Ex. 24 | Ex. 25 | Ex. 26 | Ex. 27 | Ex. 28 |
|---|---|---|---|---|---|---|---|
| $SiO_2/(MgO + CaO + SrO + BaO)$ | 5.5 | 7.5 | 7.4 | 5.7 | 5.8 | — | 5.6 |
| $Na_2O + K_2O$ | 13.5 | 15.8 | 16.1 | 13.7 | 13.8 | — | 12.8 |
| $MgO + CaO$ | 13.1 | 9.4 | 9.5 | 12.6 | 12.6 | — | 12.5 |
| $MgO + CaO + SrO + BaO$ | 13.1 | 9.4 | 9.5 | 12.6 | 12.6 | — | 12.5 |
| Fe-redox (%) | 71.4 | 57.9 | 64 | 50.3 | 30 | 47.9 | 51.0 |
| $SnO_2/SO_3$ | 37.2 | 44.0 | 10.0 | 0 | — | — | — |
| $(SnO_2/SO_3)/$Fe-redox | 0.52 | 0.76 | 0.16 | 0 | — | — | — |
| Tv (%) | 76.2 | 73.9 | 56.1 | 71.87 | 66.61 | 71.3 | 71 |
| Te (%) | 51.1 | 44.5 | 30.6 | 49.37 | 45.87 | 46.1 | 49 |
| Tuv (%) | 43.1 | 9.3 |  |  |  | 36.3 | 10 |
| SDF (%) | 10.2 | 3.0 |  |  |  |  |  |
| Dw (nm) | 493 | 511 | 555 | 529.77 | 493.5 | 501 | 516 |
| Pe (%) | 1.2 | 2.3 | 6.2 | 1.26 | 3.7 | 2.04 | 1.5 |
| Tv/Te | 1.44 | 1.60 | 1.83 | 1.46 | 1.45 | 1.55 | 1.45 |
| N value | 4.14 | 4.68 | −2.45 | −0.06 | −11.81 | −3.88 | −0.66 |
| Bubble density (/g) | 4500 | 5000 | 500 | 400 | >10000 | >10000 | >10000 |
| L* | 89.9 | 88.8 |  |  |  |  |  |
| a* | −4.65 | −7.16 |  |  |  |  |  |
| b* | −1.00 | 2.19 |  |  |  |  |  |
| c* | 4.76 | 7.49 |  |  |  |  |  |

TABLE 5

|  |  | Ex. 29 | Ex. 30 | Ex. 31 | Ex. 32 | Ex. 33 | Ex. 34 | Ex. 35 |
|---|---|---|---|---|---|---|---|---|
| Composition (%) | $SiO_2$ | 72.4 | 72.4 | 69.7 | 70.7 | 70.6 | 72.9 | 72.9 |
|  | $Al_2O_3$ | 0.5 | 0.5 | 3.5 | 1.9 | 1.9 | 0.6 | 0.6 |
|  | MgO | 4.2 | 4.2 | 0.3 | 1.6 | 1.6 | 1.6 | 1.6 |
|  | CaO | 8.9 | 8.9 | 9.6 | 9.7 | 9.6 | 10.1 | 10.1 |
|  | $Na_2O$ | 13.4 | 13.4 | 14.6 | 13.6 | 13.8 | 13.7 | 13.7 |
|  | $K_2O$ | 0.1 | 0.1 | 1.5 | 1.5 | 1.5 | 0.1 | 0.1 |
|  | $CeO_2$ | 0.464 | 0.502 | 0.350 | 0.474 | 0.457 | 0.420 | 0.424 |
|  | $Fe_2O_3$ | 0.278 | 0.207 | 0.200 | 0.284 | 0.289 | 0.294 | 0.263 |
|  | $SnO_2$ | 0.223 | 0.223 | 0.220 | 0.197 | 0.195 | 0.197 | 0.195 |
|  | CoO | 0.00000 | 0.00083 | 0.00013 | 0.00026 | 0.00027 | 0.00000 | 0.00015 |
|  | Se | 0.00061 | 0.00064 | 0.00031 | 0.00070 | 0.00075 | 0.00076 | 0.00074 |
|  | $TiO_2$ | 0.000 | 0.000 | 0.000 | 0.001 | 0.001 | 0.001 | 0.002 |
|  | $SO_3$ | 0.005 | 0.005 | 0.005 | 0.020 | 0.020 | 0.018 | 0.020 |
| $SiO_2/(MgO + CaO)$ |  | 5.5 | 5.5 | 7.0 | 6.2 | 6.3 | 6.2 | 6.2 |
| $SiO_2/(MgO + CaO + SrO + BaO)$ |  | 5.5 | 5.5 | 7.0 | 6.2 | 6.3 | 6.2 | 6.2 |
| $Na_2O + K_2O$ |  | 13.5 | 13.5 | 16.1 | 15.1 | 15.2 | 13.8 | 13.8 |
| $MgO + CaO$ |  | 13.1 | 13.1 | 9.9 | 11.3 | 11.2 | 11.7 | 11.7 |
| $MgO + CaO + SrO + BaO$ |  | 13.1 | 13.1 | 9.9 | 11.3 | 11.2 | 11.7 | 11.7 |
| Fe-redox (%) |  | 60 | 60 | 55 | 62 | 62 | 64 | 64 |
| $SnO_2/SO_3$ |  | 44.7 | 44.7 | 44.0 | 9.9 | 9.8 | 10.9 | 9.8 |
| $(SnO_2/SO_3)/$Fe-redox |  | 0.74 | 0.74 | 0.80 | 0.16 | 0.16 | 0.17 | 0.15 |
| Tv (%) |  | 72.3 | 71.7 | 71.4 | 70.9 | 70.5 | 73.2 | 72.3 |
| Te (%) |  | 50.5 | 53.0 | 52.9 | 49.3 | 49.2 | 49.5 | 51.3 |
| Tuv (%) |  | 28.5 | 28.4 | 24.8 | 28.5 | 28.4 | 32.7 | 30.9 |
| SDF (%) |  | 6.7 | 6.7 | 7.1 | 6.7 | 6.7 | 7.6 | 7.2 |
| Dw (nm) |  | 519 | 519 | 506 | 519 | 512 | 492 | 510 |
| Pe (%) |  | 1.0 | 0.8 | 0.6 | 1.0 | 1.0 | 3.0 | 1.0 |
| Tv/Te |  | 1.43 | 1.35 | 1.35 | 1.44 | 1.43 | 1.48 | 1.41 |
| N value |  | 2.19 | 5.03 | 5.17 | 2.21 | 2.01 | 1.76 | 3.00 |
| Bubble density (/g) |  | 5000 | 5000 | 5000 | 5000 | 5000 | 5000 | 5000 |
| L* |  | 88.41 | 88.04 | 87.82 | 87.67 | 87.50 | 89.13 | 88.39 |
| a* |  | −3.69 | −2.84 | −1.92 | −3.44 | −3.48 | −4.84 | −3.34 |
| b* |  | 1.20 | 1.08 | 0.45 | 1.33 | 1.10 | −1.37 | 0.97 |
| c* |  | 3.88 | 3.04 | 1.97 | 3.69 | 3.65 | 5.03 | 3.48 |

TABLE 6

|  |  | Ex. 36 | Ex. 37 |
|---|---|---|---|
| Composition (%) | $SiO_2$ | 70.9 | 70.8 |
|  | $Al_2O_3$ | 2.0 | 2.0 |
|  | MgO | 0.8 | 0.8 |
|  | CaO | 10.5 | 10.5 |

TABLE 6-continued

|  | Ex. 36 | Ex. 37 |
|---|---|---|
| $Na_2O$ | 13.4 | 13.4 |
| $K_2O$ | 1.5 | 1.5 |
| $CeO_2$ | 0.412 | 0.415 |
| $Fe_2O_3$ | 0.293 | 0.308 |
| $SnO_2$ | 0.192 | 0.195 |
| CoO | 0.00027 | 0.00057 |
| Se | 0.00070 | 0.00066 |
| $TiO_2$ | 0.001 | 0.001 |
| $SO_3$ | 0.021 | 0.028 |
| $SiO_2$/(MgO + CaO) | 6.3 | 6.2 |
| $SiO_2$/(MgO + CaO + SrO + BaO) | 6.3 | 6.2 |
| $Na_2O + K_2O$ | 14.9 | 15.0 |
| MgO + CaO | 11.3 | 11.3 |
| MgO + CaO + SrO + BaO | 11.3 | 11.3 |
| Fe-redox (%) | 56 | 55 |
| $SnO_2/SO_3$ | 44.7 | 44.7 |
| $(SnO_2/SO_3)$/Fe-redox | 0.74 | 0.74 |
| Tv (%) | 70.4 | 71.3 |
| Te (%) | 50.4 | 51.6 |
| Tuv % | 28.3 | 28.7 |
| SDF (%) | 6.6 | 6.7 |
| Dw (nm) | 553 | 551 |
| Pe (%) | 1.3 | 1.6 |
| Tv/Te | 1.40 | 1.38 |
| N value | 1.81 | 1.23 |
| Bubble density (/g) | 5000 | 5000 |
| L* | 87.33 | 87.77 |
| a* | −2.67 | −2.58 |
| b* | 2.07 | 1.90 |
| c* | 3.38 | 3.21 |

Each Examples 1 to 23 and 29 to 37 contains respective elements of iron, tin, cerium, and sulfur in predetermined amounts and satisfies Fe-redox of 50% or more, and thus, they have a low solar transmittance, a high visible light transmittance, and a low ultraviolet transmittance. Furthermore, each glass contains a small amount of bubbles.

Since Example 25 does not contain $CeO_2$, glass having a high Tuv is formed.

Since Example 24 contains a large amount of sulfur, Tv is low due to amber coloring.

Since Examples 26 to 28 do not contain sulfur, glass having a large amount of bubbles is formed.

While the present invention has been described in detail and with reference to specific embodiments thereof, it will be apparent to one skilled in the art that various changes and modifications can be made therein without departing from the spirit and scope thereof. The present application is based on Japanese Patent Application (No. 2015-088582) filed on Apr. 23, 2015, and the contents are incorporated herein by reference.

INDUSTRIAL APPLICABILITY

The heat-ray- and ultraviolet-absorbing glass plate of the present invention has low solar transmittance and ultraviolet transmittance, has a high visible light transmittance, is suppressed from amber coloring, and is preferably gray in color. Thus, it is useful as a glass plate for vehicles, building, and the like.

The invention claimed is:

1. A heat-ray- and ultraviolet-absorbing glass plate that is a soda lime glass comprising, as represented by mass percentage based on oxides:

| | |
|---|---|
| total iron calculated as $Fe_2O_3$ | 0.05 to 0.3%, |
| total tin calculated as $SnO_2$ | 0.02 to 0.5%, |
| total cerium calculated as $CeO_2$ | 0.01 to 2.9%, and |
| total sulfur calculated as $SO_3$ | 0.003 to 0.1%, |
| Se | 0.0001 to 0.0050%, | and
having:
a mass proportion of divalent iron calculated as $Fe_2O_3$ to the total iron calculated as $Fe_2O_3$ being 50% or more,
a visible light transmittance Tv (illuminant A, 2° visual field) as defined in JIS R 3106 (1998) being 66% or more as a value calculated as 4 mm thickness of the glass plate,
a solar transmittance Te as defined in JIS R 3106 (1998) being 65% or less as a value calculated as 4 mm thickness of the glass plate,
a ratio Tv/Te of the visible light transmittance Tv (illuminant A, 2° visual field) as defined in JIS R 3106 (1998) as a value calculated as 4 mm thickness of the glass plate to the solar transmittance Te as defined in JIS R 3106 (1998) as a value calculated as 4 mm thickness of the glass plate being 1.3 or more,
an ultraviolet transmittance Tuv as defined in ISO 9050 (2003) being 50% or less as a value calculated as 4 mm thickness of the glass plate,
a dominant wavelength Dw as defined in JIS Z 8701 (1999) of 400 to 550 nm, as a value calculated as 4 mm thickness of the glass plate, and
an excitation purity Pe as defined in JIS Z 8701 (1999) being 3% or less as a value calculated as 4 mm thickness of the glass plate.

2. The heat-ray- and ultraviolet-absorbing glass plate according to claim 1, wherein the soda lime glass comprises, as represented by mass percentage based on oxides:

| | |
|---|---|
| $SiO_2$ | 65 to 80%, |
| $Al_2O_3$ | 0 to 6%, |
| MgO | 0 to 10%, |
| CaO | 5 to 12%, |
| $Na_2O$ | 5 to 18%, and |
| $K_2O$ | 0 to 5%. |

3. The heat-ray- and ultraviolet-absorbing glass plate according to claim 1, wherein the soda lime glass comprises, as represented by mass percentage based on oxide:
total iron calculated as $Fe_2O_3$: 0.05 to 0.32%.

4. The heat-ray- and ultraviolet-absorbing glass plate according to claim 1, wherein the soda lime glass comprises, as represented by mass percentage based on oxide:
total cerium as calculated as $CeO_2$: 0.01 to 0.60%.

5. The heat-ray- and ultraviolet-absorbing glass plate according to claim 1, wherein the soda lime glass comprises substantially no coloring component except for iron, selenium, cobalt, and $TiO_2$.

6. The heat-ray- and ultraviolet-absorbing glass plate according to claim 1, wherein the soda lime glass comprises substantially no $TiO_2$.

7. The heat-ray- and ultraviolet-absorbing glass plate according to claim 1, further comprising, as represented by mass percentage based on oxides:
CoO: 0.00005 to 0.0030%.

8. The heat-ray- and ultraviolet-absorbing glass plate according to claim 1, wherein the soda lime glass comprises, as represented by mass percentage based on oxide:
CoO: 0.00027 to 0.002%.

9. The heat-ray- and ultraviolet-absorbing glass plate according to claim 1, wherein the soda lime glass comprises, as represented by mass percentage based on oxide:
CoO: 0.00057 to 0.002%.

10. The heat-ray- and ultraviolet-absorbing glass plate according to claim 1, wherein the soda lime glass comprises, as represented by mass percentage based on oxide:
Se: 0.00035 to 0.0010%.

11. The heat-ray- and ultraviolet-absorbing glass plate according to claim 1, wherein the soda lime glass comprises, as represented by mass percentage based on oxide:
total sulfur calculated as $SO_3$: 0.018% to 0.1%.

12. The heat-ray- and ultraviolet-absorbing glass plate according to claim 1, wherein the soda lime glass comprises, as represented by mass percentage based on oxide:
total sulfur calculated as $SO_3$: 0.021% to 0.1%.

13. The heat-ray- and ultraviolet-absorbing glass plate according to claim 1, wherein the soda lime glass comprises, as represented by mass percentage based on oxide:
total sulfur calculated as $SO_3$: 0.003 to 0.05%.

14. The heat-ray- and ultraviolet-absorbing glass plate according to claim 1, having a mass proportion of divalent iron calculated as $Fe_2O_3$ to total iron calculated as $Fe_2O_3$ being 57% or more.

15. The heat-ray- and ultraviolet-absorbing glass plate according to claim 1, satisfying a mass ratio ($SnO_2/SO_3$) of the content of the total tin calculated as $SnO_2$ to the content of the total sulfur calculated as $SO_3$ being from 0.2 to 100.

16. The heat-ray- and ultraviolet-absorbing glass plate according to claim 1, satisfying a ratio (($SnO_2/SO_3$)/Fe-redox) of the mass ratio ($SnO_2/SO_3$) of the content of the total tin calculated as $SnO_2$ to the content of the total sulfur calculated as $SO_3$ to the mass proportion (Fe-redox) of divalent iron calculated as $Fe_2O_3$ to the total iron calculated as $Fe_2O_3$ being from 0.0025 to 5.

17. The heat-ray- and ultraviolet-absorbing glass plate according to claim 1, satisfying the following N value being 0 or more:

N value=(mass of divalent iron calculated as $Fe_2O_3$)−40×(total iron calculated as $Fe_2O_3$)−6×(total tin calculated as $SnO_2$)+5×(total sulfur calculated as $SO_3$)+(total cerium calculated as $CeO_2$)+14, provided that the mass of divalent iron calculated as $Fe_2O_3$ is a product of Fe-redox and the total iron calculated as $Fe_2O_3$.

18. The heat-ray- and ultraviolet-absorbing glass plate according to claim 1, having a* value and b* value as defined in JIS Z 8781 (1999) satisfying: −10≤a*≤2 and −4≤b*≤6, as values calculated as 4 mm thickness of the glass plate.

19. The heat-ray- and ultraviolet-absorbing glass plate according to claim 1, having a Tv/Te of 1.49 or more.

20. A method for producing a heat-ray- and ultraviolet-absorbing glass plate, comprising:
preparing a glass raw material to be the following glass composition;
melting the raw material at 1,400° C. to 1,550° C. in a melting furnace to form molten glass; and
forming the molten glass into a glass plate by a plate glass-forming apparatus, to thereby obtain a glass plate having:
a mass proportion of divalent iron calculated as $Fe_2O_3$ to total iron calculated as $Fe_2O_3$ being 50% or more,
a visible light transmittance Tv (illuminant A, 2° visual field) as defined in JIS R 3106 (1998) being 66% or more as a value calculated as 4 mm thickness of the glass plate,
a solar transmittance Te as defined in JIS R 3106 (1998) being 65% or less as a value calculated as 4 mm thickness of the glass plate,
a ratio Tv/Te of the visible light transmittance Tv (illuminant A, 2° visual field) as defined in JIS R 3106 (1998) as a value calculated as 4 mm thickness of the glass plate to the solar transmittance Te as defined in JIS R 3106 (1998) as a value calculated as 4 mm thickness of the glass plate being 1.3 or more, and
a ultraviolet transmittance Tuv as defined in ISO 9050 (2003) being 50% or less as a value calculated as 4 mm thickness of the glass plate,
a dominant wavelength Dw as defined in JIS Z 8701 (1999) of 400 to 550 nm, as a value calculated as 4 mm thickness of the glass plate, and
an excitation purity Pe as defined in JIS Z 8701 (1999) being 3% or less as a value calculated as 4 mm thickness of the glass plate,
the glass plate comprising a soda lime glass comprising, as represented by mass percentage based on oxides,

| | |
|---|---|
| total iron calculated as $Fe_2O_3$ | 0.05 to 0.3%, |
| total tin calculated as $SnO_2$ | 0.02 to 0.5%, |
| total cerium calculated as $CeO_2$ | 0.01 to 2.9%, |
| total sulfur calculated as $SO_3$ | 0.003 to 0.1%, and |
| Se | 0.0001 to 0.0050%. |

* * * * *